United States Patent
Jayabalan et al.

(10) Patent No.: US 9,813,329 B2
(45) Date of Patent: Nov. 7, 2017

(54) METHOD FOR MULTI-CHASSIS REDUNDANCY USING ANYCAST AND GTP TEID

(71) Applicant: Telefonaktiebolaget L M Ericsson (publ), Stockholm (SE)

(72) Inventors: Madhavan Jayabalan, Bangalore (IN); Arnab Choudhury, Vastra Frolunda (SE); Kousik Nandy, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 221 days.

(21) Appl. No.: 14/727,773

(22) Filed: Jun. 1, 2015

(65) Prior Publication Data

US 2016/0352623 A1    Dec. 1, 2016

(51) Int. Cl.
| | |
|---|---|
| *H04L 1/00* | (2006.01) |
| *H04L 12/703* | (2013.01) |
| *H04L 12/24* | (2006.01) |
| *H04L 12/741* | (2013.01) |
| *H04L 12/751* | (2013.01) |
| *H04L 12/939* | (2013.01) |
| *H04L 12/26* | (2006.01) |

(52) U.S. Cl.
CPC .......... *H04L 45/28* (2013.01); *H04L 41/0654* (2013.01); *H04L 45/026* (2013.01); *H04L 45/74* (2013.01); *H04L 49/557* (2013.01); *H04L 43/0805* (2013.01)

(58) Field of Classification Search
CPC ....... H04L 45/28; H04L 45/026; H04L 45/74; H04L 41/0654; H04L 49/557; H04L 43/0805; H04L 45/741; H04L 49/55; H04L 49/552; H04L 49/555; H04L 43/0811; H04L 43/0817; H04L 43/0823

See application file for complete search history.

(56) References Cited

U.S. PATENT DOCUMENTS

| | | | |
|---|---|---|---|
| 6,779,039 B1 * | 8/2004 | Bommareddy | ... H04L 29/12009 709/226 |
| 7,055,173 B1 * | 5/2006 | Chaganty | ............ H04L 41/0654 726/11 |
| 8,200,739 B2 | 6/2012 | Bonnier et al. | |

(Continued)

OTHER PUBLICATIONS

3GPP TS 23.060 V12.8.0, "General Packet Radio Service (GPRS); Service description; Stage 2," 3rd Generation Partnership Project, Technical Specification Group Services and System Aspects, Release 12, (Mar. 2015), 350 pages.

(Continued)

*Primary Examiner* — Kevin Mew
(74) *Attorney, Agent, or Firm* — Patent Portfolio Builders, PLLC

(57) ABSTRACT

A method is implemented by a network device for improving availability of network component using multi-chassis redundancy by efficiently re-routing data traffic intended for the network component in the event of a link or node failure. The network device is in a set of network devices hosting the network component each network device in the set of network devices having a shared cluster identifier and a separate node identifier. The set of network devices hosting the network component share a virtual internet protocol address.

20 Claims, 12 Drawing Sheets

(56) References Cited

U.S. PATENT DOCUMENTS

| | | | | |
|---|---|---|---|---|
| 2003/0189920 | A1* | 10/2003 | Erami | H04J 14/0227 370/351 |
| 2004/0078621 | A1* | 4/2004 | Talaugon | G06F 11/2028 714/4.1 |
| 2006/0236017 | A1* | 10/2006 | Rooholamini | H04L 49/557 710/316 |
| 2009/0052317 | A1* | 2/2009 | Takagi | H04L 41/12 370/223 |
| 2011/0317703 | A1* | 12/2011 | Dunbar | H04L 12/462 370/392 |
| 2012/0033672 | A1* | 2/2012 | Page | H04L 45/245 370/395.53 |
| 2012/0106322 | A1* | 5/2012 | Gero | H04L 12/437 370/225 |
| 2012/0147737 | A1* | 6/2012 | Taylor | H04L 41/0663 370/219 |
| 2012/0182866 | A1* | 7/2012 | Vinayagam | H04L 45/245 370/228 |
| 2013/0077621 | A1* | 3/2013 | Jacob Da Silva | H04L 45/58 370/355 |
| 2013/0094350 | A1* | 4/2013 | Mandal | H04L 45/64 370/217 |
| 2013/0194914 | A1* | 8/2013 | Agarwal | H04L 45/245 370/225 |
| 2014/0016456 | A1 | 1/2014 | Bonnier et al. | |
| 2016/0241515 | A1* | 8/2016 | Pai | H04L 63/0209 |
| 2016/0254991 | A1* | 9/2016 | Eckert | H04L 12/4633 |

OTHER PUBLICATIONS

3GPP TS 23.401 V12.8.0, "General Packet Radio Service (GPRS) enhancements for Evolved Universal Terrestrial Radio Access Network (E-UTRAN) access," 3rd Generation Partnership Project, Technical Specification Group Services and System Aspects, Release 12, (Mar. 2015), 308 pages.

* cited by examiner

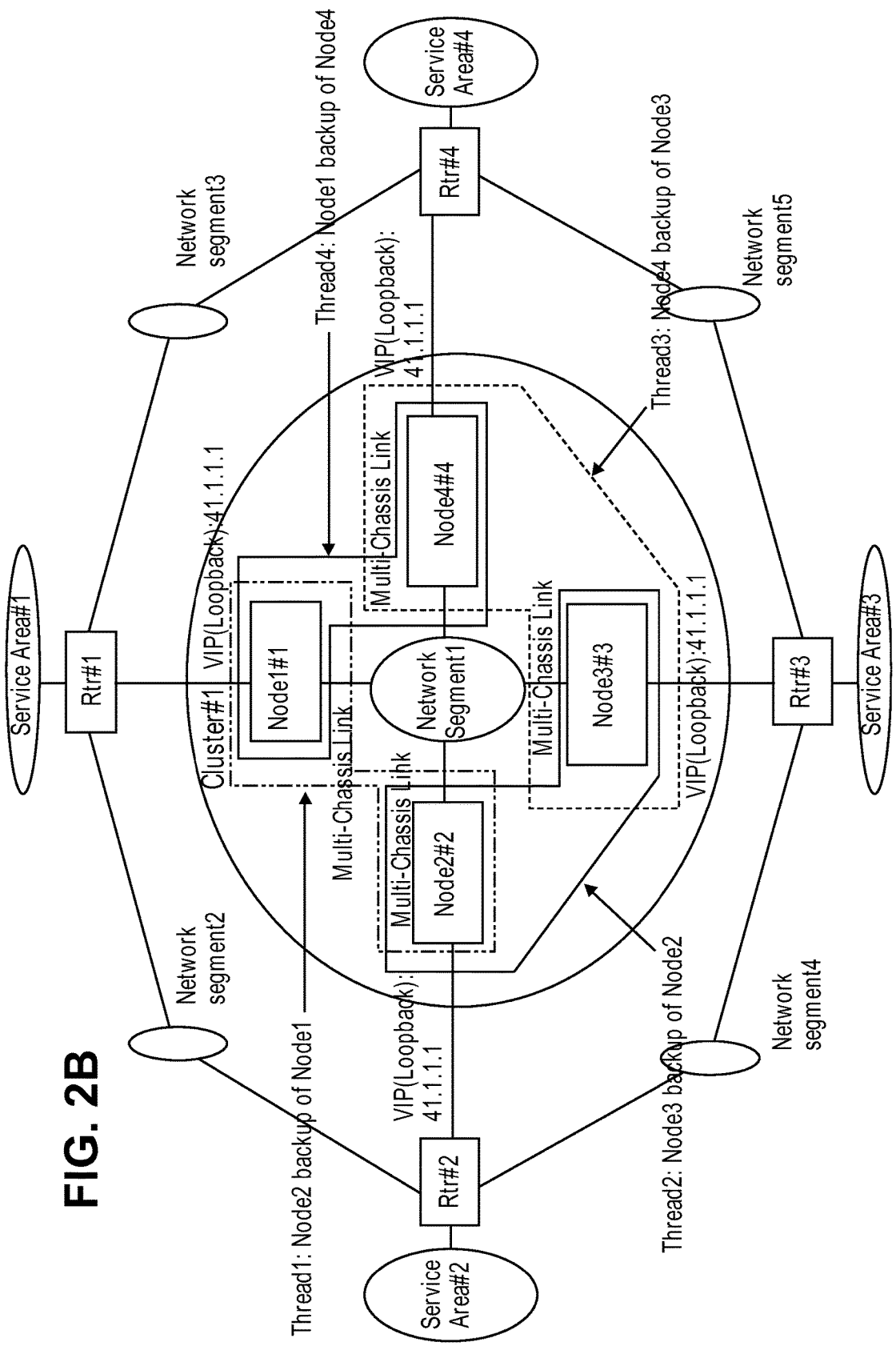

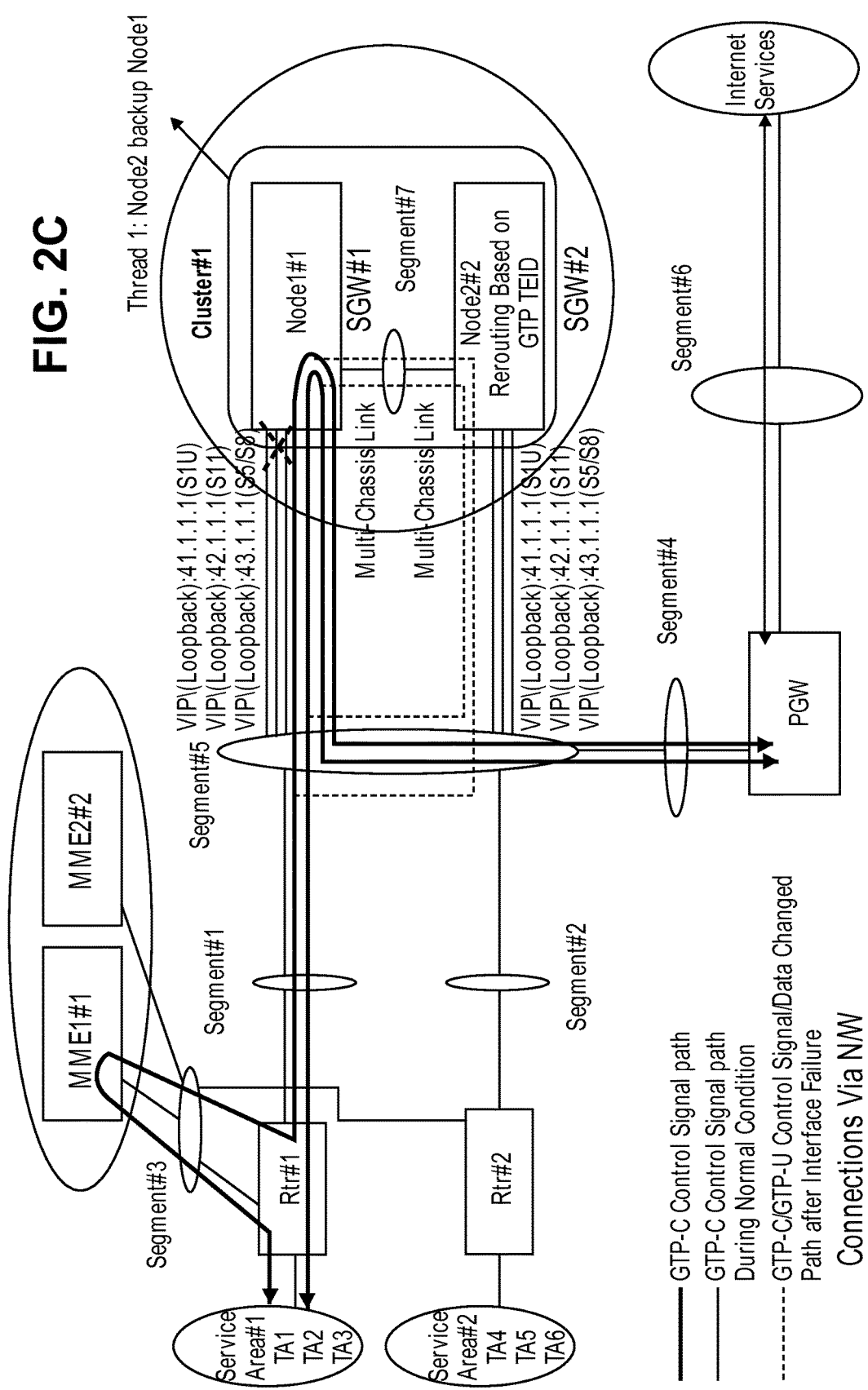

Outline of the GTP-U Header

The format of EPC specific GTPv2 Control Plane message Header

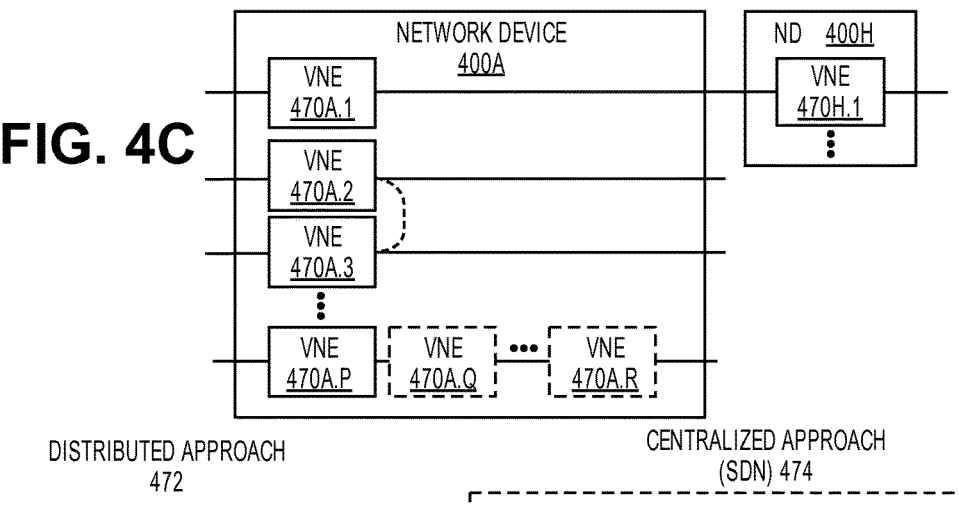
FIG. 4C
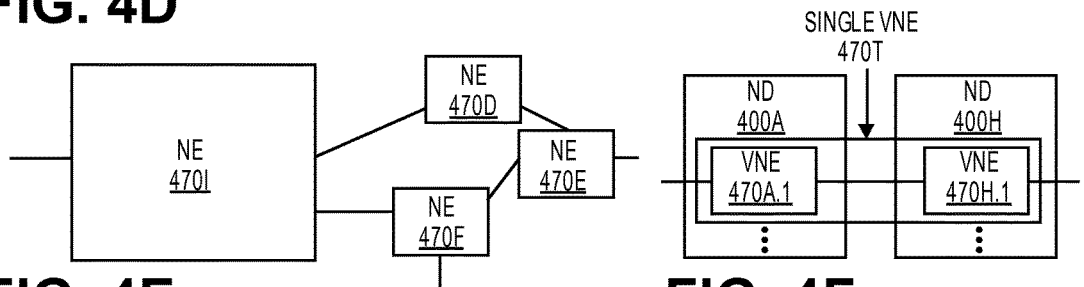
FIG. 4D
FIG. 4E
FIG. 4F

METHOD FOR MULTI-CHASSIS REDUNDANCY USING ANYCAST AND GTP TEID

FIELD

Embodiments of the invention relate to providing an uninterrupted service in the case of interface or node failures in an evolved packet core (EPC) architecture. In particular, the embodiments provide a method and system for redundancy where gateways in the EPC are grouped into clusters with each node in the cluster tracking the same interfaces and virtual internet protocol addresses using an addressing system such as Anycast.

BACKGROUND

In modern deployment of network gateways (of different kinds, especially PGW/SGW in 3GPP architecture) it is extremely important to provide high availability, as any downtime is disastrous. An example of a network where high availability is important is a $3^{rd}$ Generation Partnership Project (3GPP) long term evolution (LTE) network including an evolved packet core (EPC). The EPC includes multiple network gateways including serving gateways (SGWs) and packet data network (PDN) gateways (PGWs). Both of these types of gateways require high availability for the proper function of the EPC.

In many networks, multiple physical chassis are deployed to work as a single logical entity that implements multiple network gateways or other components of a network. A chassis is a physical housing for networking devices that may be modular to include add on components. Such a configuration using multiple chassis is known as Inter Chassis Redundancy (ICR), where failure of one chassis results in transferring its loads (e.g. user sessions) to another chassis. Inter chassis resilience provides session resilience support across multiple nodes (typically two nodes) in different regions to allow geographical redundancy. ICR is intended to provide node level session resilience functionalities using a 1:1 redundancy model with two nodes. One node acts as active node which handles live sessions and user traffic and the other node acts as hot standby to back up the active node.

Network redundancy in an EPC can be based on the S1-Flex mechanism. The S1-Flex mechanism provides support for network redundancy and load sharing of traffic across network elements in the EPC. The components of the EPC including the mobility management entity (MME) and SGW can have redundancy by creating a pool of MMEs and SGWs and allowing each eNodeB (an evolved node B that connects the EPC to a radio access network (RAN)) to be connected to multiple MMEs and SGWs in a pool. The S1-Flex mechanism ensures functionality and flexibility with no single point of failure thereby providing a high availability for the EPC to the user equipment attached to the RANs.

SUMMARY

In one embodiment, a method is implemented by a network device for improving availability of network component using multi-chassis redundancy by efficiently re-routing data traffic intended for the network component in the event of a link or node failure. The network device is in a set of network devices hosting the network component each network device in the set of network devices having a shared cluster identifier and a separate node identifier. The set of network devices hosting the network component share a virtual internet protocol address. The method includes receiving a data packet by a first network device in the set of network devices destined for a network component via the virtual internet protocol address, checking whether a cluster identifier matches the shared cluster identifier, and checking whether a node identifier matches the node identifier of the first network device. The method further includes checking whether a second node in the set of network devices is alive that matches the node identifier, where the node identifier does not match the first network device, encapsulating the data packet to be sent to the second node where the second node is alive, and forwarding the encapsulated data packet to the second node where the second node is alive.

In another embodiment, a network device is configured for improving availability of a network component using multi-chassis redundancy by efficiently re-routing data traffic intended for the network component in the event of a link or node failure. The network device in a set of network devices hosting the network component where each network device in the set of network devices has a shared cluster identifier and a separate node identifier. The set of network devices hosting the network component sharing a virtual internet protocol address, the network device including a non-transitory computer-readable medium having stored therein a protection module, and a processor coupled to the non-transitory computer-readable medium. The processor is configured to execute the protection module. The protection module is configured to receive a data packet by a first network device in the set of network devices destined for a network component via the virtual internet protocol address, to check whether a cluster identifier matches the shared cluster identifier, to check whether a node identifier matches the node identifier of the first network device, to check whether a second node in the set of network devices is alive that matches the node identifier, where the node identifier does not match the first network device, to encapsulate the data packet to be sent to the second node where the second node is alive, and to forward the encapsulated data packet to the second node where the second node is alive.

In one embodiment, a computing device is configured to execute a plurality of virtual machines for implementing network function virtualization (NFV), wherein a virtual machine from the plurality of virtual machines is configured to implement a method for improving availability of network component using multi-chassis redundancy by efficiently re-routing data traffic intended for the network component in the event of a link or node failure. The network device is in a set of network devices hosting the network component where each network device in the set of network devices has a shared cluster identifier and a separate node identifier. The set of network devices hosting the network component sharing a virtual internet protocol address. The computing device includes a non-transitory computer-readable medium having stored therein a protection module, and a processor coupled to the non-transitory computer-readable medium, the processor configured to execute the protection module, the protection module configured to receive a data packet via a first network device in the set of network devices destined for a network component via the virtual internet protocol address, to check whether a cluster identifier matches the shared cluster identifier, to check whether a node identifier matches the node identifier of the first network device, to check whether a second node in the set of network devices is alive that matches the node identifier, where the node identifier does not match the first network device, to encapsulate the data packet to be sent to the second node where the second node is alive, and to forward the encapsulated data packet to the second node where the second node is alive.

In one embodiment, a control plane device is configured to implement a control plane of a software defined networking (SDN) network including a plurality of network devices implementing the method for improving availability of a network component using multi-chassis redundancy by efficiently re-routing data traffic intended for the network component in the event of a link or node failure. The network device is in a set of network devices hosting the network component where each network device in the set of network devices has a shared cluster identifier and a separate node identifier. The set of network devices hosting the network component shares a virtual internet protocol address. The control plane device includes a non-transitory computer-readable medium having stored therein a protection module, and a processor coupled to the non-transitory computer-readable medium, the processor is configured to execute the protection module, the protection module configured to receive a data packet via a first network device in the set of network devices destined for a network component via the virtual internet protocol address, to check whether a cluster identifier matches the shared cluster identifier, to check whether a node identifier matches the node identifier of the first network device, to check whether a second node in the set of network devices is alive that matches the node identifier, where the node identifier does not match the first network device, to encapsulate the data packet to be sent to the second node where the second node is alive, and to forward the encapsulated data packet to the second node where the second node is alive.

BRIEF DESCRIPTION OF THE DRAWINGS

The invention may best be understood by referring to the following description and accompanying drawings that are used to illustrate embodiments of the invention. In the drawings:

FIG. 2B is a diagram of another embodiment of a network implementing multi-chassis redundancy.

FIG. 2C is a diagram of one example scenario with link failure handled by multi-chassis redundancy in an evolved packet core (EPC) network.

FIG. 4C illustrates various exemplary ways in which virtual network elements (VNEs) may be coupled according to some embodiments of the invention.

FIG. 4D illustrates a network with a single network element (NE) on each of the NDs of FIG. 4A.

FIG. 4E illustrates an example where each of the NDs implements a single NE (see FIG. 4D), but the centralized control plane has abstracted multiple of the NEs in different NDs into a single NE in one of the virtual network(s) of FIG. 4D, according to some embodiments of the invention.

FIG. 4F illustrates a case where multiple VNEs are implemented on different NDs and are coupled to each other, and where the centralized control plane has abstracted these multiple VNEs such that they appear as a single VNE within one of the virtual networks, according to some embodiments of the invention.

DETAILED DESCRIPTION

Figure 1A:
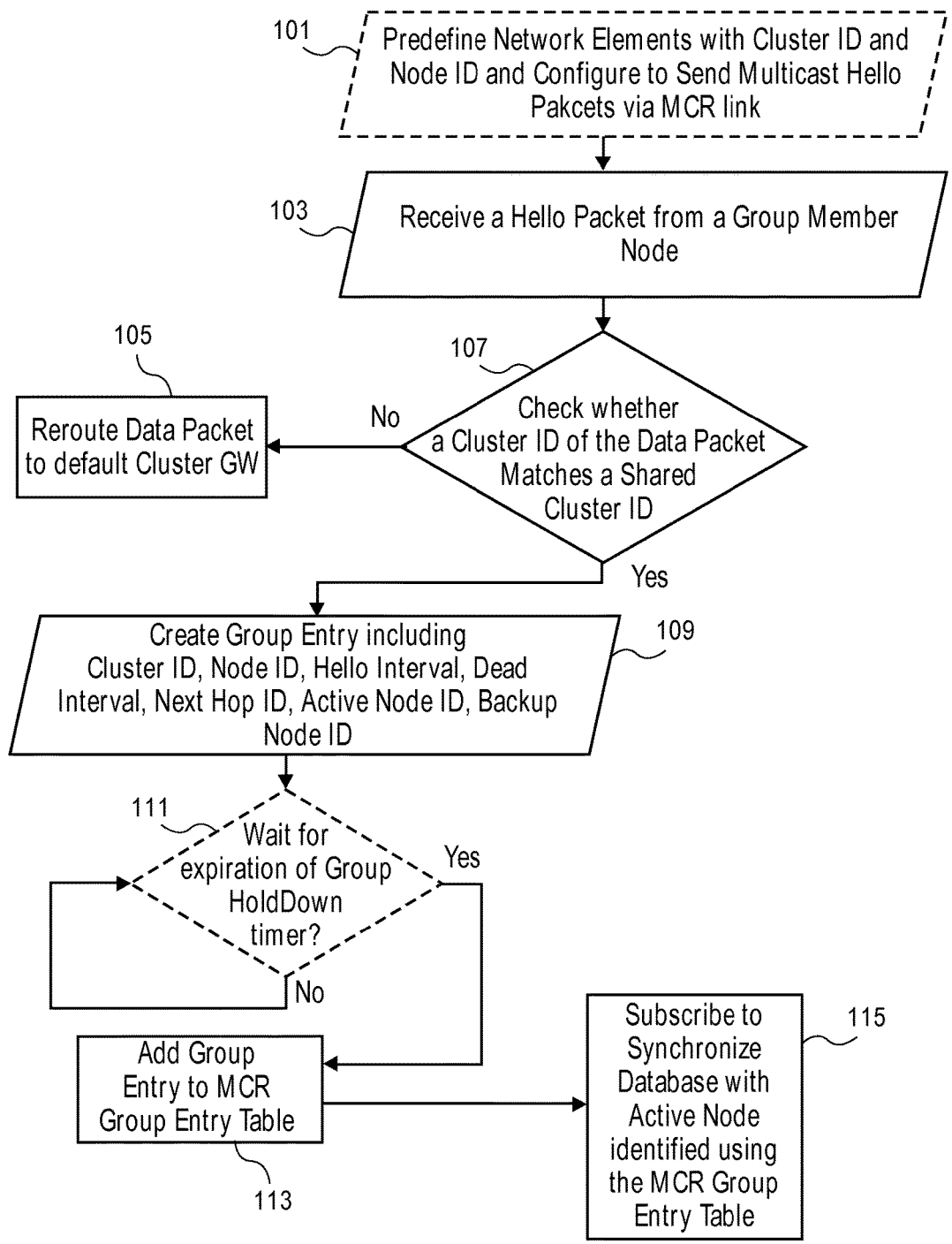
FIG. 1A is a flowchart of one embodiment of a process for discovery and configuration of nodes in a cluster providing multi-chassis redundancy.

The following description describes methods and apparatus for implementing a system for improving redundancy to achieve high availability for nodes configured in a cluster where the method and system can be implemented as a complete or partial solution by combining functions of Anycast, multi-chassis link protection, re-routing of data packets (e.g., general packet radio service (GPRS) tunneling protocol (GTP) packets in a evolved packet core (EPC) of a long term evolution (LTE) network) based on the use of a cluster identifier and node identifier (e.g., in a modified GTP tunnel endpoint identifier (TEID)) as well as a sequential loop node backup configuration. The combination of these features enables a linear network growth and decreases overhead of data packet processing in the network.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

To provide uninterrupted service, in the event of any interface or node failure, the embodiments provide a solution for network devices such as gateways and in particular evolved packet core (EPC) network elements like a service gateway (SGW) to achieve complete redundancy at the node level. The embodiments can also be implemented partially for only certain types of interface failures such as GTP interface failures for any network elements which will have GTP running on its Interfaces (e.g., S11-MME, Gn/Gp-SGSN in an EPC).

In the embodiments, network devices which are geographically apart from each other will function as nodes and form a cluster. Each node in the cluster has to track the same interface and has to use the same VIP address. In order to use the same Virtual IP, in an example embodiment Anycast is used to distribute received data frames. This will allow the network to forward the data packets such as GTP packets to the closest node in the network.

This configuration helps in providing redundancy for interface failures. Any GTP interface failure will cause the intermediate routing devices to withdraw the current closest Anycast routes (for the destination VIP) from current network device (e.g., a SGW). After withdrawal of routes in the routing device next preferred nodes routes will be installed. Data packets (e.g., GTP packets) will be forwarded to the other network devices (e.g., another SGW) in the cluster based on the new routes installed. Upon reception of the packet the backup node will reroute the data packet to the active node (e.g., a hosted SGW) by looking into a header or similar data structure carrying a cluster identifier and node identifier. In one example embodiment, a GTP tunnel endpoint identifier (TEID) is used to carry identification of the active node. In one example of the embodiments, a GTP TEID which is a 32 bit tunnel identifier is used to carry the cluster identifier (i.e. a Cluster ID) (reserved 1-4 bits) and an SGW Node ID (reserved 1-3 bits) in its most significant bits. In this example EPC scenario, the process re-routes GTP packets from non-host SGW to host SGW and will use generic routing encapsulation (GRE) encapsulation over a multi-chassis interconnection link.

A multi-chassis communication channel (inter-chassis redundancy transport link) will connect all the nodes in the cluster. Each network device will have entries about the group members and track its aliveness. Lookup of group entry table gives aliveness status of the destined traffic node. The current receiving node will follow its routing table to route the traffic to the destined node via multi-chassis channels.

The embodiments also supports redundancy for node and chassis level failure by configuring nodes in a sequential loop. Where the nodes are identified with their unique node identifiers (IDs). Each node forms a backup of one another node in a sequential loop.

The prior art has a number of limitations and problems that are overcome by the embodiments. The prior art deployment of inter-chassis redundancy (ICR) is available in two models, either in an All Active model, which has linear scaling but lacks database backup for each other to provide session synchronization, or in an Active-Standby model which provides database backup but lacks linear scaling. In the Active-Standby model, bidirectional session sync (active to standby and standby to active) will happen when the previous active node recovers from fault and comes back up to take over any interface failover. In the prior art many interfaces are tracked for redundancy purpose (e.g., in an EPC the S1U, S11, SGI etc interfaces). If any one of the interface fails then ICR switchover is triggered. ICR implementation has multiple states (Active with peer, Active No peer, pending standby and Standby). However, having multiple states increases complexity.

The All Active(Pool/Flex) redundancy mechanism involves peer side elements like eNodeBs/MMEs during failures. When an ICR transport link goes down and if both the nodes are not receiving the prefixes then both the nodes will move to Active No Peer state. This is called as spit brain condition (where both nodes behave as Active Nodes). When the ICR transport link comes back up the split brain situation needs to be resolved. When the ICR transport link comes back up one node will move to Active with Peer (AWP) and another node will move to standby. Active node first sync sessions to standby and standby node needs to synchronize sessions to Active node. Also, during the split brain situation, to avoid Internet Protocol (IP) duplication need have mechanisms like one node will allocate odd IP addresses and another node needs to allocate even IP addresses. This increases the complexity of handling split brain situation resolution. The existing solution of Active-Standby supports only single failure at a time. Thus, the prior art has significant limitations in operation and significant complexity that requires additional resources. Further, the existing ICR solution Active-Standby is always in pairs and lacks linear scaling. All Active solution lack session synchronizations among members in a cluster.

In the embodiments the disadvantages of the prior art are overcome, nodes will form a cluster and the embodiments will achieve linear scaling along with session synchronization among member nodes within a cluster in a sequential loop. This gives the capability to add/removed one node at time. The embodiments are also stateless. This reduces a significant amount of processing overhead and complexity. The prior art needs to maintain AWP, Active no Peer (ANP), Pending Standby and Standby states. Dynamic synchronization will be unidirectional. Bulk Synchronization will require a one-time bidirectional synchronization during node recovery.

The Seamless service access without interruption, as no switchover involved on interface failures. Failure downtime will now be completely based on routing protocol performance. Proposed solution targets to achieve interface failures to be handled using Anycast routing, where other cluster members will only be partially involved in re-routing all the traffic meant for an interface failure of a peer node element. No access side elements like eNodeB's involvement is required during failure.

No Split brain situation complexity is introduced by the embodiments. If the ICR transport link and any tracked interface is down, both the ICR nodes will move to Active No Peer state (called as split brain) in the prior art. This problem will not occur in the embodiments, since they are stateless. This greatly reduces complex designs in IP pool handling and database syncing after split brain situation resolution.

In the embodiments, it is possible to support multi-point interface level failure, such as GTP multi-port interfaces including intra and inter nodes in the same cluster. It depends on the number of nodes used in the cluster such as for inter nodes multi-point GTP interface failure protection. Since the embodiments use the Anycast routing mechanism for redundancy, even when more than one path fails (e.g. S11 path failure for both Node 1 and Node 2 in the illustrated FIG. 2C) if any other path is available (e.g. S11 path towards Node 3 in FIG. 2C) it will forward the traffic towards the available one. Here Node 3's involvement will only be limited to GTP TEID parsing and re-routing towards hosted SGW (either Node 1 or Node 2) based on TEID.

Figure 2A:
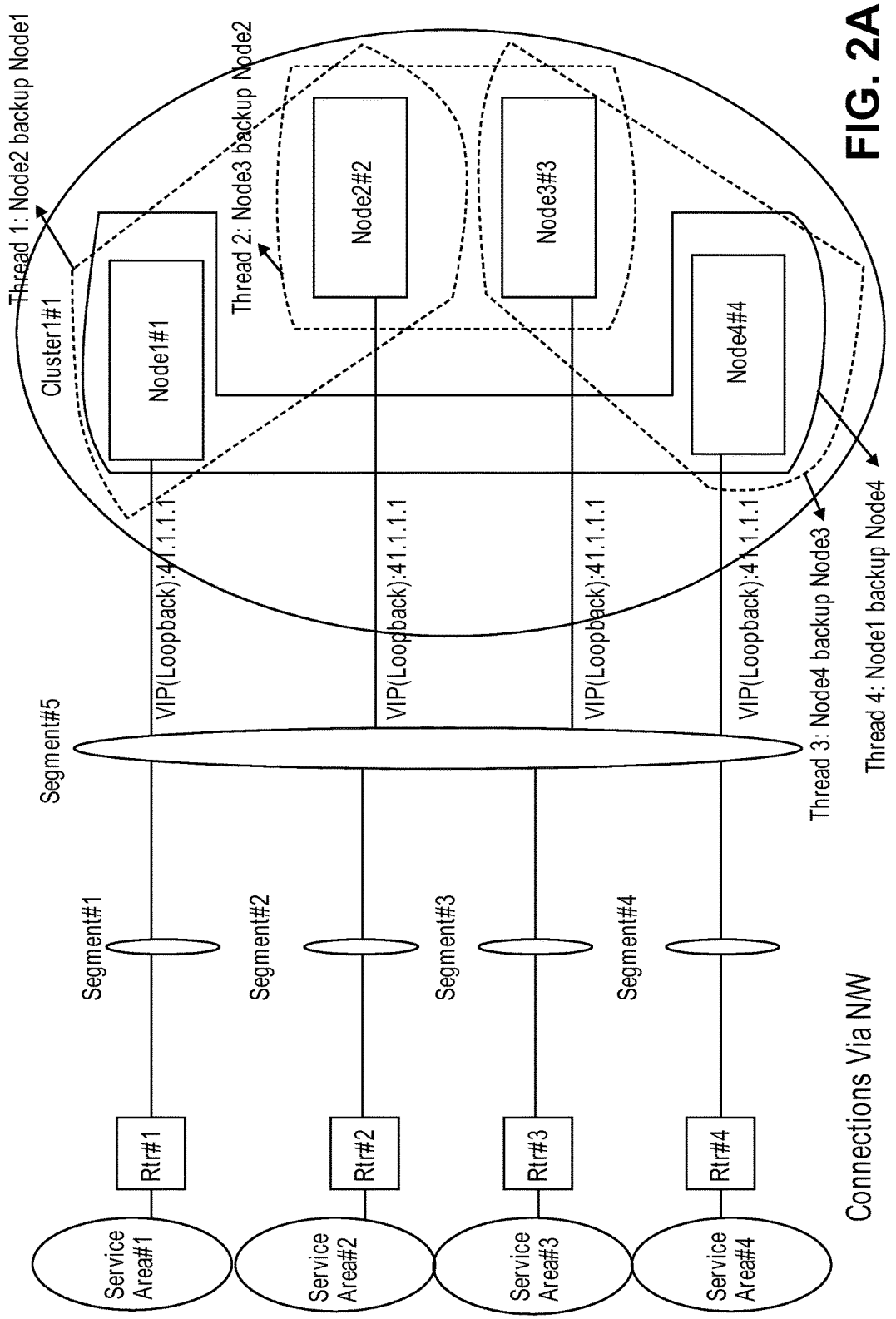
FIG. 2A is a diagram of one embodiment of a network implementing multi-chassis redundancy.

FIG. 1A is a flowchart of one embodiment of a process for discovery and configuration of nodes in a cluster providing multi-chassis redundancy. The process of FIG. 1A may be described with reference to an example network configuration of FIG. 2A. The network of FIG. 2A shows a set of Service Areas (#s 1-4) that connect to a set of Nodes (#s 1-4 that provide similar services and/or functions to computing devices in the Service Areas. These Service Areas can have a default correlation with their respective nodes, for example Service Area #1 with Node #1. However, this relationship is implemented via a shared virtual IP address (VIP) such that the rerouting of any data traffic to the cluster including Nodes #1-4 is transparent to the Service Areas. Any number of intermediate devices or network segments may be a part of the path between the Service Areas and the Cluster. The nodes of the cluster are organized into a sequence of active nodes and backups, where each node is active and simultaneously serving as a backup for another node. In one example embodiment, each node is the backup for the preceding node in the sequence with the wrap around of the first node serving as the backup for the last node. The process as described establishes and configures this set of relationships.

The process is executed independently by each node in the cluster. The process begins with each of the nodes, i.e. network elements or network devices, in the cluster being configured with a unique node identifier (Node ID) and a unique cluster identifier (Cluster ID) (Block 101). The Node ID can be unique local to the group or global to a network. Similarly, the Cluster ID can be unique to a network or globally unique to a wide area network such as the Internet. The nodes are configured to send hello messages on all of their interfaces (i.e. as a multicast transmission) of the multi-chassis redundancy link. In other words all other nodes in the multi-chassis redundancy links.

For each node in the cluster, it receives a hello packet from another group member node in a cluster (Block 103). The node checks the hello packet to determine whether it includes a cluster ID that matches a shared cluster ID of the processing node (Block 107). If the cluster ID does not match the processing node, then the hello packet is rerouted toward the default cluster gateway to then be forwarded to nodes of the identified cluster (Block 105). The cluster ID must match as each node in the cluster is concerned with having information about its peers in the cluster and not nodes outside of the cluster. IF the cluster ID does match, then the process creates (or updates) a group entry including a Cluster ID, Node ID, Hello Interval, Dead Interval, Node ID, Next Hop ID, Active Node ID, Backup Node ID and similar fields. The fields of the group entry can be populated with information from the hello packet about the sending node, including the Cluster ID, Node ID, hello interval and similar information. Other information can be derived such as next hop ID can be derived from the receiving interface and the active node and backup node IDs can be determined based on the sequencing of nodes.

With the creation of the group entry a check can be made if sufficient time has transpired to ensure that a group holddown timer has expired, indicating that the hello packets have been received from all of the group members. The process then continues by adding the created group entry to a MCR group entry table (Block 113). The node then subscribes (Block 115) or communicates with the active node that it is associated with according to the sequence determined from the exchange of the hello messages between group members. The node then continuously synchronizes its database or similar resources with the active node so that the processing node can serve as backup to the active node in the event of the node failure.

Figure 1B:
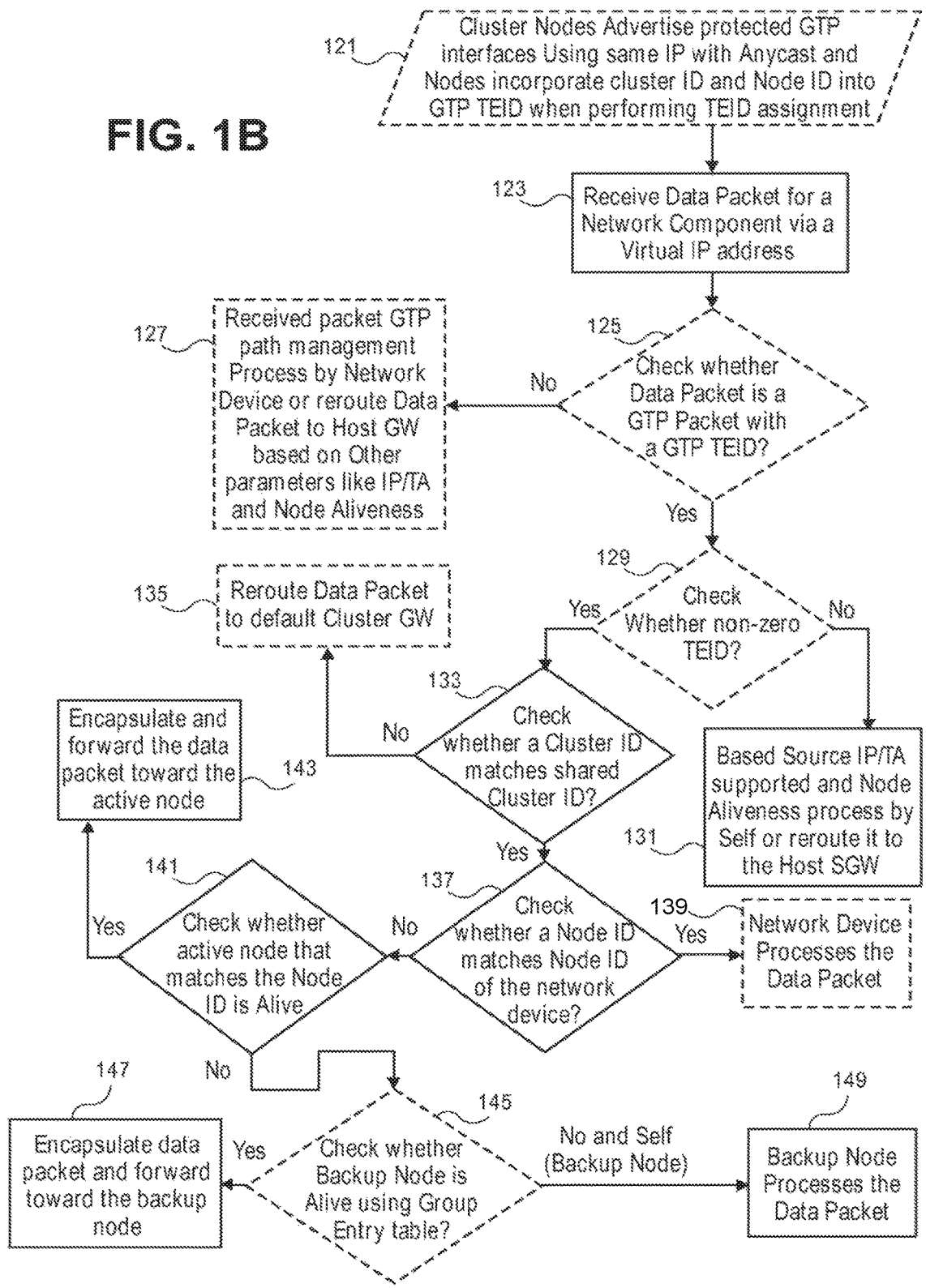
FIG. 1B is a flowchart of one embodiment of a process for processing data packets to provide multi-chassis redundancy

FIG. 1B is a flowchart of one embodiment of a process for processing data packets to provide multi-chassis redundancy. After the configuration of the nodes in a cluster as set forth above in regard to FIG. 1A, then the process of handling data packets to implement the multi-chassis redundancy process can begin to handle link and node failures. The process can begin with each of the nodes in a cluster advertising protected interfaces (e.g., protected GTP interfaces) using a same IP address (i.e. virtual IP address) with Anycast or similar data packet distribution technology such that all nodes incorporate cluster ID and node ID in their data packets (e.g., in GTP TEID) when performing TEID assignment and when transmitting GTP packets (Block 121). Example modifications to GTP TEID, GTP-U headers, and GTPv2 control plane message headers are illustrated in reference to FIGS. 3A-C.

Each node in the cluster then processes received data packets affected by the MCR process, the MCR process can apply to any subset of data traffic handled by the nodes (e.g., GTP packets) (Block 123). The data packets received may be for a network component executed by a network element or network device. The received data packets are received using the shared virtual IP address. A check is then made whether the data packet is one that is to be handled by the MCR process, e.g., whether the data packet is a GTP packet with a GTP TEID (Block 125). If the data packet is not of the type to be processed by the MCR process then the data packet can be designated for alternative processing. For example, the received GTP packet can be processed according to a standard GTP path management process or rerouted to a host gateway based on other parameters such as the IP address, target address, node aliveness or similar criteria (Block 127). The GTP packet can also be also can be processed using other mechanisms like preconfigured mappings or learned failures using a multi-chassis channel. If the data packet is a type that is designated for handling, then in some embodiments additional checks may be made such as whether the GTP TEID value is zero (Block 129). A zero value GTP TEID can indicate that a new subscriber has been encountered. In this case, the GTP packet may be handled differently than the MCR process, such as based on the source IP address, tracking areas served by SGWs, node aliveness or reroute to a host serving gateway (Block 131). The GTP packet can also be processed using other mechanisms like preconfigured mappings or learned failures using a multi-chassis channel.

For those data packets to be handled by the MCR process, a check whether a cluster ID matches the shared cluster ID is made (Block 133). If the shared cluster ID is not present in the received data packet, then the data packet can be forwarded toward a default cluster gateway (Block 135). The default cluster gateway can forward the data packet toward the nodes of the matching cluster. If the cluster ID does match the shared cluster ID, then a check is made whether a node ID of the data packet matches the node ID of the processing node, i.e., the network device, (Block 137). If the node ID does match, then the network device can process the received data packet according to its content (Block 139). However, if the node ID does not match, then it may indicate that Anycast has forwarded the data packet to the processing network device due to a link or node failure. A check can be made whether the active node that matches the node ID is alive by checking the MCR group entry table (Block 141). If the node associated with the node ID is alive then the received data packet is encapsulated and forwarded toward the active node (Block 143). The encapsulation can be general routing encapsulation (GRE).

If the node associated with the node ID is not alive then a check is made whether the backup node is alive using the MCR group entry table (Block 145). The MCR group entry table includes an explicit identification of the backup node for a given active node and can be derived from the sequence of the nodes in the cluster. If the backup node is alive then the data packet is encapsulated and forwarded toward the backup node (Block 147). The encapsulation can be GRE or similar encapsulation. If the backup node is the processing node then the processing node can keep and process the data packet (Block 149). In other embodiments, the data packet can be forwarded or encapsulated to be forwarded to another network device to be processed.

FIG. 2B is a diagram of another embodiment of a network implementing multi-chassis redundancy. This is an alternate MCR configuration from that which was illustrated in FIG. 2A. In this embodiment, the nodes have a circular or concentric architecture around a network segment providing the multi-chassis links between the nodes #1-4. The nodes #1-4 are otherwise similarly connected with and service a set of Service Areas #1-4. Each of these service areas is connected with a node #1-4 via a shared VIP address. The nodes #1-4 utilize the explicit sequencing to establish active node and backup node relationships shown via a set of dashed line boxes around the node pairs.

FIG. 2C is a diagram of one example scenario with link failure handled by multi-chassis redundancy in an evolved packet core (EPC) network. In this embodiment, the nodes #1 and #2 configured with the multi-chassis redundancy in an EPC network are serving gateways (SGWs). In the example, the communication with node #1 and service area #1 or MME #1 is blocked by a failure of some of the interfaces S1U and S11 of the node #1. The GTP packets are routed to node #2 in segment #5 implementing Anycast where they are then forwarded via the multi-chassis link to node #1 where they are serviced and sent on to the packet data network (PDN) gateway (PGW).

Figure 2D:
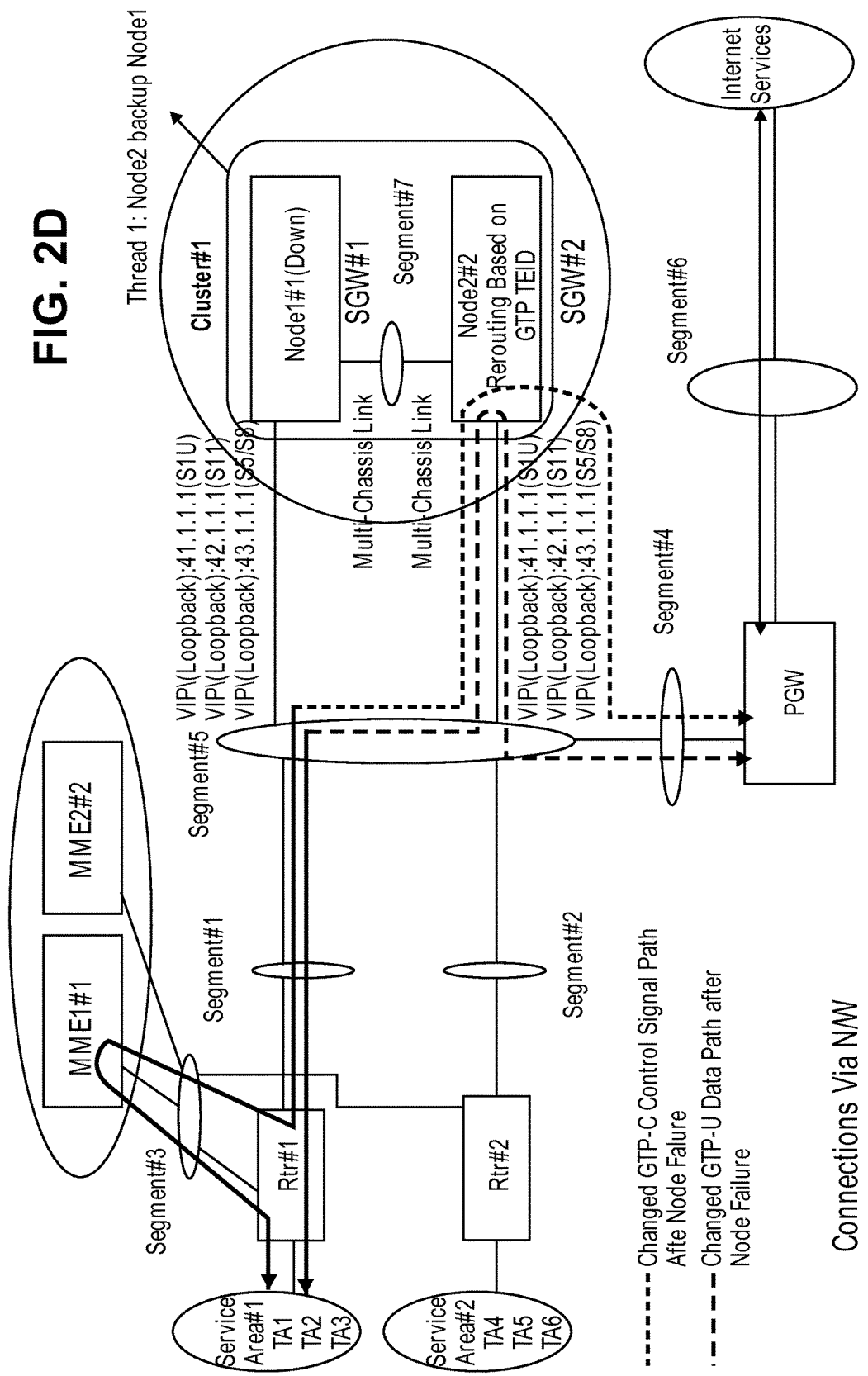
FIG. 2D is a diagram of one example scenario with node failure handled by multi-chassis redundancy in an evolved packet core (EPC) network.

FIG. 2D is a diagram of one example scenario with node failure handled by multi-chassis redundancy in an evolved packet core (EPC) network. In this embodiment, the nodes #1 and #2 configured with the multi-chassis redundancy in an EPC network are servicing gateways (SGWs). In the example, the communication with node #1 and service area #1 or MME #1 is blocked by a failure of node #1. The GTP packets are routed to node #2 in segment #5 implementing Anycast where they are then processed as described herein above and then forwarded to the packet data network (PDN) gateway (PGW).

FIGS. 2C and 2D are two example implementations in an EPC architecture. In mobile packet core, a multi-chassis redundancy solution is shown for a group or cluster of nodes (SGW, or PGW, or even CGW). Each group carries a unique cluster ID, and each individual chassis within a cluster is identified by a unique node ID. Each node shares the same Interface IP's of GTP interfaces. In order to re-route the subscriber traffic to hosted gateway, GTP TEID format is proposed to be extend to carry cluster ID and node ID.

This example embodiment allows the cluster to have a multi-chassis solution for even or odd number of nodes, which provides linear scaling. Service outages caused due to interface/link failure are reduced with minimal processing overheads, allowing the subscribers to have uninterrupted service accesses during failure scenarios.

In these example embodiments, Anycast is used to achieve redundancy against link failure. This mechanism uses the concept of link protection (a node simultaneously can act as application gateway as well as routing device for Traffic Re-routing). To provide redundancy in multi-chassis environment Anycast is used to choose the nearest node. Based on GTP TEID of host node (where the mobility session is anchored) is identified and traffic is re-routed if it reaches the cluster through non-hosted gateway. Anycast needs to be used either with an interior gateway protocol (IGP) or external gateway protocol (EGP). This allows choosing the closest available path allowing the same interface IP being shared to all other nodes in the cluster. This also helps the network to gain other advantages of Anycast, like less susceptibility to attacks. Cluster ID and node ID are encoded in the GTP TEID. Based on this, node takes the decision. Whether the current node hosts the session traffic or it has to be forwarded to the other node in the cluster. If the other nodes host the session traffic, based on its aliveness traffic will be forwarded to that node. If it is not alive then another node (based on node ID) will have the backup session database. If the receiving node is the backup node then it can process the traffic itself or it will forward to the node which is having the database backup of the failed node.

Database Synchronization Across a Node and its Backup

In the example embodiment and all the general embodiments, all the nodes in the cluster are interconnected and all of them are active. Each node in the cluster provides redundancy to one another based on their node ID. Node ID's are incremented sequentially based on the logical topology. A node will provide backup to the next lower node ID node, except the node with the highest Node ID will be backed up by the lowest node ID node to complete the loop.

Subscriber dynamic database syncing happens from a node to the next higher node ID node. Hence sync is always unidirectional reducing the overhead of reverse sync during split brain and processing overhead. Node addition/removal will not have much overhead, only the newly added node and its peers need to perform required database synchronization. Reverse synchronization will only be done once in the case of complete node failure and then recovered. Upon recovery the new active node will sync subscriber database from backup.

Stateless Implementation:

In the example embodiments and the general embodiments, all the nodes in the cluster are Active, and there is no ICR state maintained. Group member entries needs to be learned by member nodes of the cluster and updated via multicast hellos or keep-alive mechanism.

The network elements need to be predefined with Cluster ID to identify cluster and Node ID to identify node element in cluster. For this proposed solution all the nodes forming the cluster are expected to have the reachability using Multi-Chassis link either directly or indirectly via network segments. Through these links, group members are discovered and subscriber database is shared between nodes. Open Shortest Path First (OSPF) Hellos can be used as one mechanism for group member discovery and sharing Information of Cluster-ID (Area-ID), Node-ID (Router-ID), Hello Interval (or KeepAlive Interval) and dead Interval (Hold down timer). But the solution doesn't limit to OSPF or any specific protocol for the mentioned discovery mechanism. Any Mechanism or protocol can be used as Multi-chassis protocol should be able to use the multi-casting for the Hellos or keepAlives.

Initially when the nodes are coming up in the group, each node should broadcast all their data including Cluster-ID (Area-ID), Node-ID (Router-ID), Hello Interval (or KeepAlive Interval), Dead Interval (Holddown timer) to create Group Entry Table.

Other member nodes that listen to the hello or KeepAlives node should match the cluster ID first and then create an entry table of Multi-chassis interconnection interface VIP address, Next Hop IP, cluster ID and Node-ID, Backup Node ID, Hello or Keep Alive time, Hold down time etc. With every receipt of Hello or Keep Alive the group entry should be updated and the entry should stay active till the next update. Nodes in a group should also maintain a Group Hold down timer as an expiry timer, which needs to be used once after every boot of the cluster to wait for the maximum time for all the nodes in the cluster to come up and to do the calculation for the Group Entry Table.

Handling of Uplink traffic to hosted SGW

In normal scenario since the cluster SGW nodes will use the same interface VIP for S1-U interface (GTPv1-U Interface), it is difficult to ensure the uplink traffic from eNodeB lands up to the SGW node where the corresponding session is hosted and not get routed to a different SGW node. To avoid such situation the proposed solution recommends that the intermediate routing devices play an important role in segregating traffic based on source IP. Our solution proposes that each SGW which wants to protect its S1U Interface failure needs to support a range of IPs which it would like to listen on. So that the eNodeBs which are part of service areas served by that particular host SGW needs to have their S1U interface configured with IPs in the same supported range. Hence when intermediate routing device (the aggregator router) receives any GTP based uplink traffic from an eNodeB to get forwarded to S1U of SGW should make routing decisions based on the source IP to route the required GTP payload packet to the correct host SGW. In case of failure since Anycast routing mechanism will be in place the packets will be routed to a different SGW of the same cluster. Non-host SGW which should parse it based on GTP TEID mapping will re-route it back to the hosted node if it is Alive, else it will forward to the backup. Non-host SGW needs to use GRE encapsulation or similar other mechanism of the original GTP packet to reroute the packets to the host SGW.

Path Management Packets

GTP path management packets like GTP-U echo messages don't carry TEID. In case of interface failures these messages will land up in non-host node, which has to be forwarded to the hosted GW. This can be done using the filtering on the specified IP range based on source IP (belonging to the eNodeBs, which are very limited in number and hence can be statically configured) the non-host SGW should forward it to the host SGW.

Failure of Hosted Node

During node failure, when the next high Node-ID node receives the new session request (redirected from the Anycast routed node if necessary) it should store the new session information in the backup database which is meant for the failed node. When the failed node recovers it learns all the subscriber information from the database of the backup node. For the highest Node ID the backup will be available from the lowest Node ID.

Subscriber database syncing happens in two ways,
1. Bulk syncing where complete database needs to be synced after node reboot.
2. Dynamic syncing where dynamic addition/modification/deletion of subscribers needs to be synced.

On interface failures charging will still be continued to be taken care by the same node since it will continue to receive its traffic after being re-routed. But on complete node failure, backup node needs to generate the charging information for the failed nodes UE sessions as soon it marks peer dead.

Addition/Removal of a Node from Cluster

The proposal supports addition/removal of nodes one at a time with fewer overheads from cluster. Only Peer nodes needs database modifications without affecting all members in the cluster. After any addition/removal, further addition/removal can be done only after the group converges (after database update).

Node Recovery

Upon node recovery, a node needs to recover subscriber database from the backup node. Bulks sync will be performed. It should publish itself to the group and to the external network. It also needs to send keepalives to its partner node and update its group entry table. Reverse sync will happen only on node recovery.

Conclusion

The general and example embodiments for multi-chassis redundancy is bridging the benefits of prior available solutions of 1:1 (mated pair) and all active pool to achieve linear scaling along with session synchronizations together with less complexity. Mobility Gateways (SGWs) can be grouped together in a cluster, which can provide redundancy mechanism for both Interface and Node level failures simultaneously. On failure Anycast routing with MCLP, GTP TEID parsing and GRE encapsulation helps to re-route the packets to host Gateway. Cluster member nodes backing up each other as per node ID provides session subscriber database backup with regular synchronization.

Packet Structures

Figure 3A:
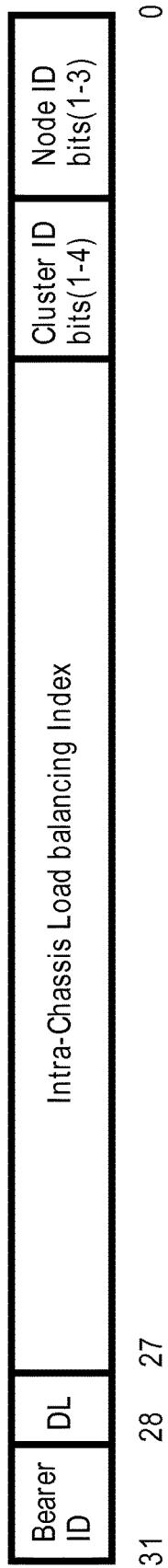
FIG. 3A is a diagram of one embodiment of a general packet radio service (GPRS) tunneling protocol (GTP) tunnel endpoint identifier (TEID).

FIG. 3A is a diagram of one embodiment of a general packet radio service (GPRS) tunneling protocol (GTP) tunnel endpoint identifier (TEID). In this embodiment, the GTP TEID has been modified to include a node ID and cluster ID in the most significant bits (MSB) of the GTP TEID. In one embodiment, the identifiers can be 1-5 bits or in length or have similar dimensions.

Figure 3B:
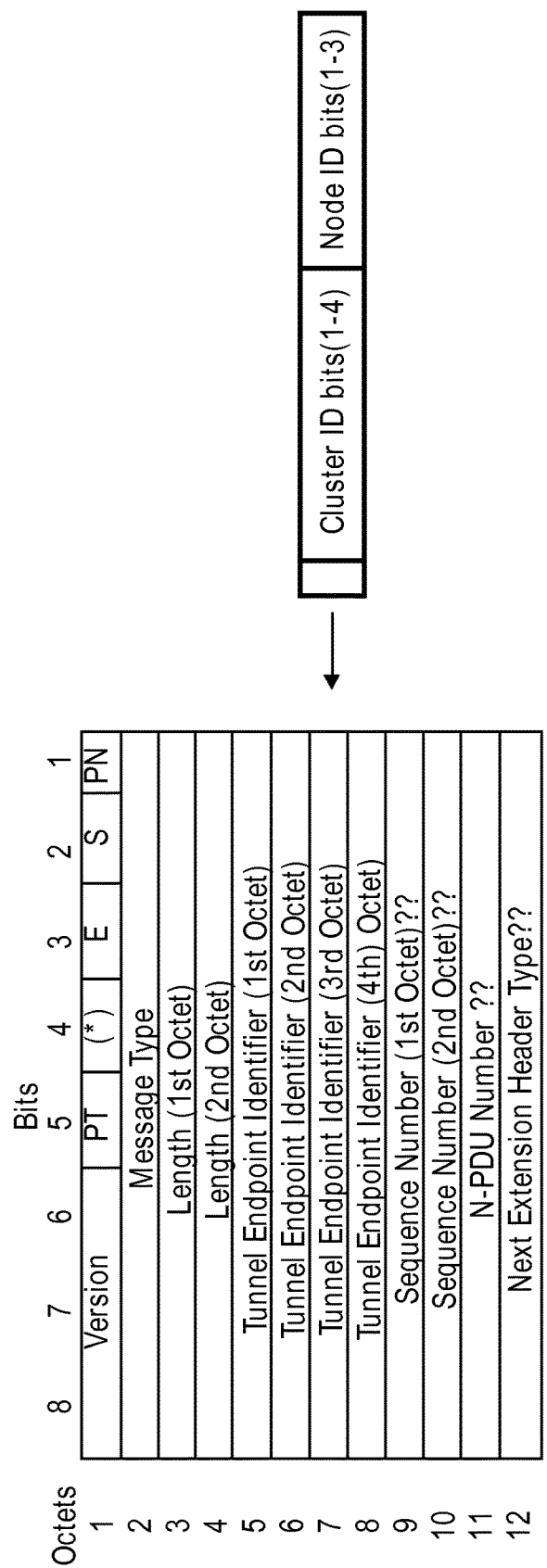
FIG. 3B is a diagram of one embodiment of a GTP-U header.

FIG. 3B is a diagram of one embodiment of a GTP-U header. In this embodiment, any of the TEIDs of the GTP-U header can include the cluster ID and node ID bits. The bits can remain the most significant bits of the TEID and can have any size or length to store any range of values. In other embodiments, the cluster ID and/or node ID can be encoded in any part of the packet and any type of data packet can be utilized in conjunction with the embodiments of the invention.

Figure 3C:
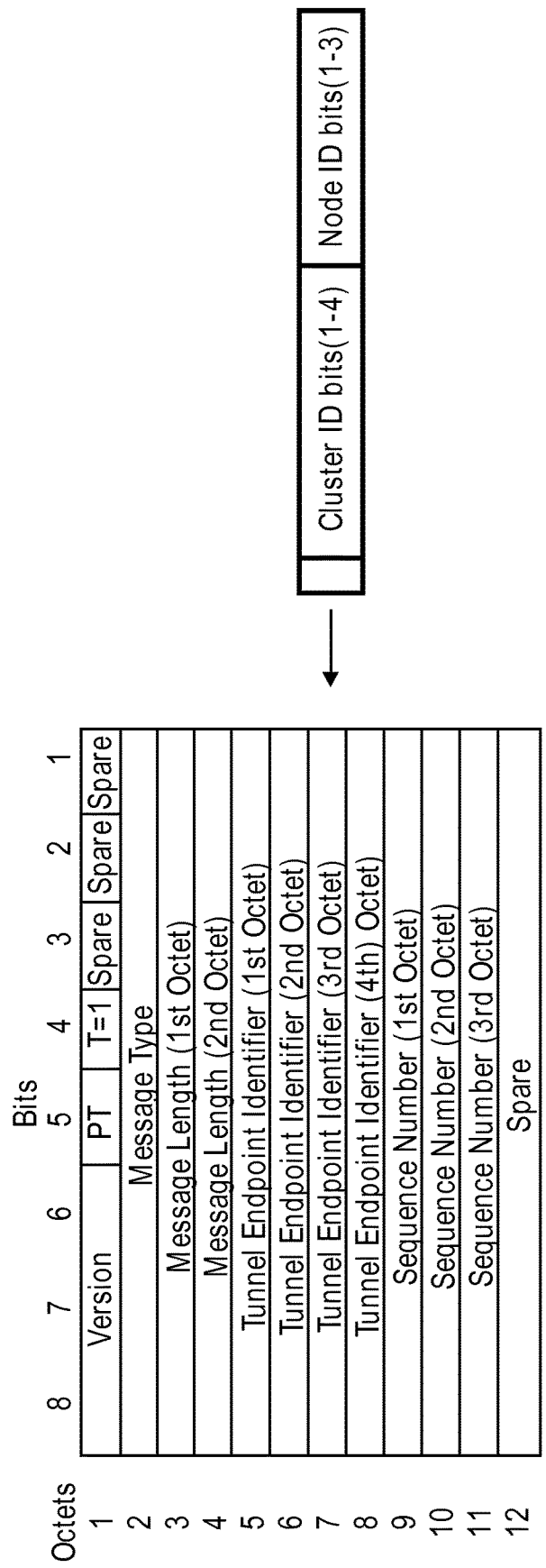
FIG. 3C is a diagram of one embodiment of GTPv2 control plane message header.

FIG. 3C is a diagram of one embodiment of GTPv2 control plane message header. In this embodiment, any of the TEIDs of the GTPv2 header can include the cluster ID and node ID bits. The bits can remain the most significant bits of the TEID and can have any size or length to store any range of values. In other embodiments, the cluster ID and/or node ID can be encoded in any part of the packet and any type of data packet can be utilized in conjunction with the embodiments of the invention.

Architecture

Figure 4A:
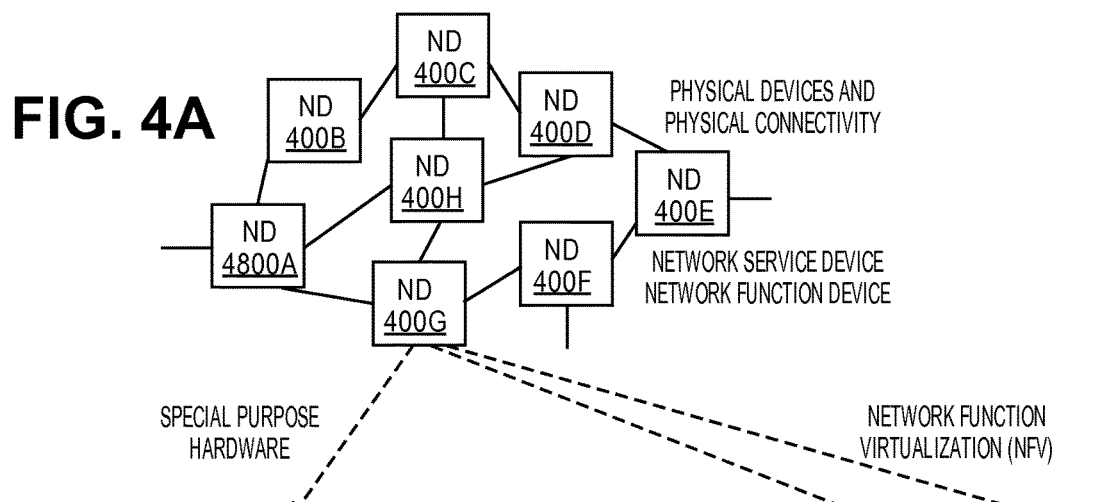
FIG. 4A illustrates connectivity between network devices (NDs) within an exemplary network, as well as three exemplary implementations of the NDs, according to some embodiments of the invention.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated circuits (ASICs) and a proprietary operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A). In some embodiments, the control communication and configuration module 432A encompasses the protection module 433A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) (i.e. implemented as match action tables) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) are to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
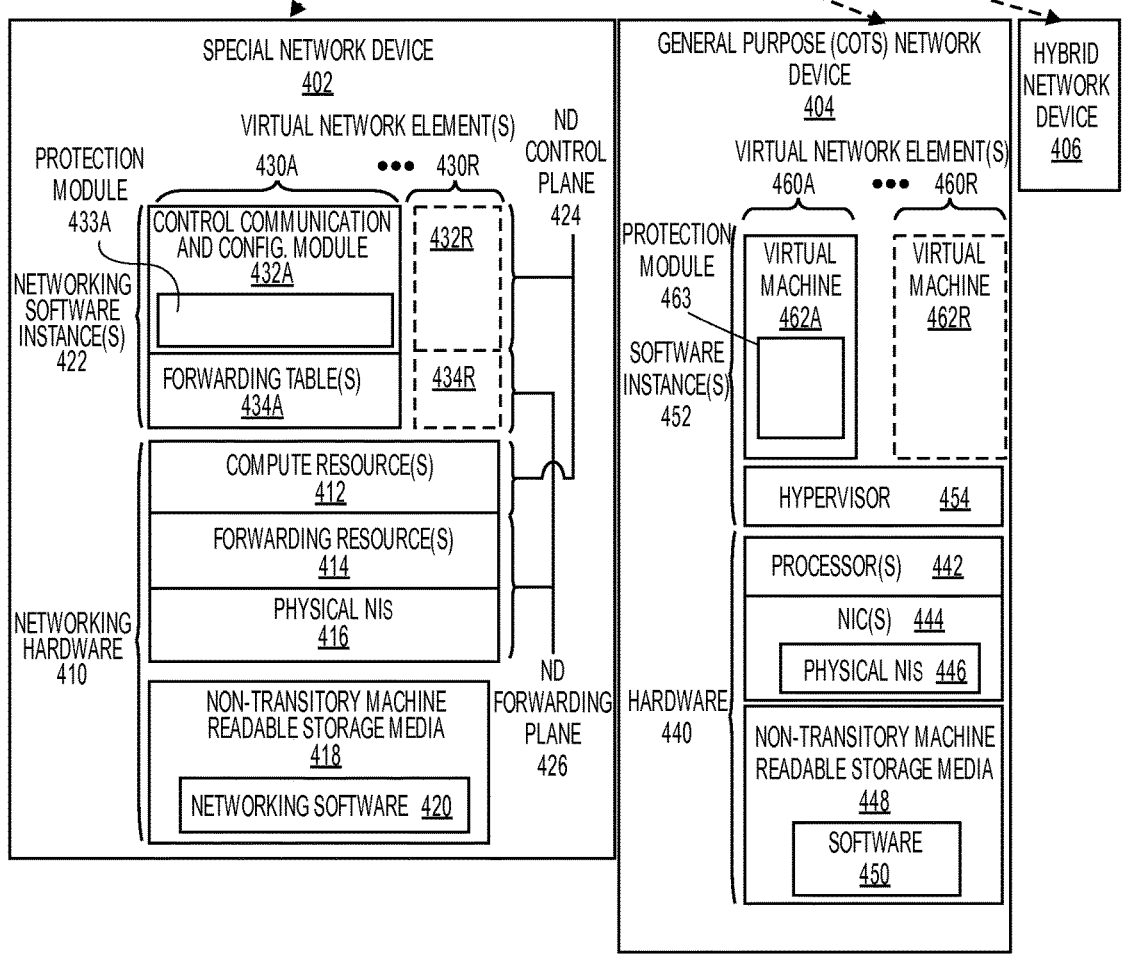
FIG. 4B illustrates an exemplary way to implement the special-purpose network device according to some embodiments of the invention.
Figure 4B:
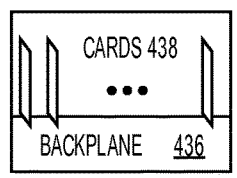

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 804 includes hardware 840 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate a hypervisor 454 (sometimes referred to as a virtual machine monitor (VMM)) and one or more virtual machines 462A-R that are run by the hypervisor 454, which are collectively referred to as software instance(s) 452. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 462A-R, and that part of the hardware 440 that executes that virtual machine (be it hardware dedicated to that virtual machine and/or time slices of hardware temporally shared by that virtual machine with others of the virtual machine(s) 462A-R), forms a separate virtual network element(s) 460A-R. In some embodiments, the virtual machine 462A encompasses protection module(s) 463.

The virtual network element(s) 460A-R perform similar functionality to the virtual network element(s) 430A-R. For instance, the hypervisor 454 may present a virtual operating platform that appears like networking hardware 410 to virtual machine 462A, and the virtual machine 462A may be used to implement functionality similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 462A-R differently. For example, while embodiments of the invention are illustrated with each virtual machine 462A-R corresponding to one VNE 460A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 454 includes a virtual switch that provides similar forwarding services as a physical Ethernet switch. Specifically, this virtual switch forwards traffic between virtual machines and the NIC(s) 444, as well as optionally between the virtual machines 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content server or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the virtual machines 862A-R may operate as servers; the same would be true for the hybrid network device 806; in the case of the special-purpose network device 802, one or more such servers could also be run on a hypervisor executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (as well as RSVP-Traffic Engineering (TE): Extensions to RSVP for LSP Tunnels, Generalized Multi-Protocol Label Switching (GMPLS) Signaling RSVP-TE) that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R that are implementations of match action tables (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 806.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach). In some embodiments, the centralized reachability and forwarding information module 479 encompasses configuration and and forwarding functions in protection module(s) 481 as described herein above.

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The application layer 486 thus enables the execution of applications that manage or interact with the functions associated with the network elements.

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
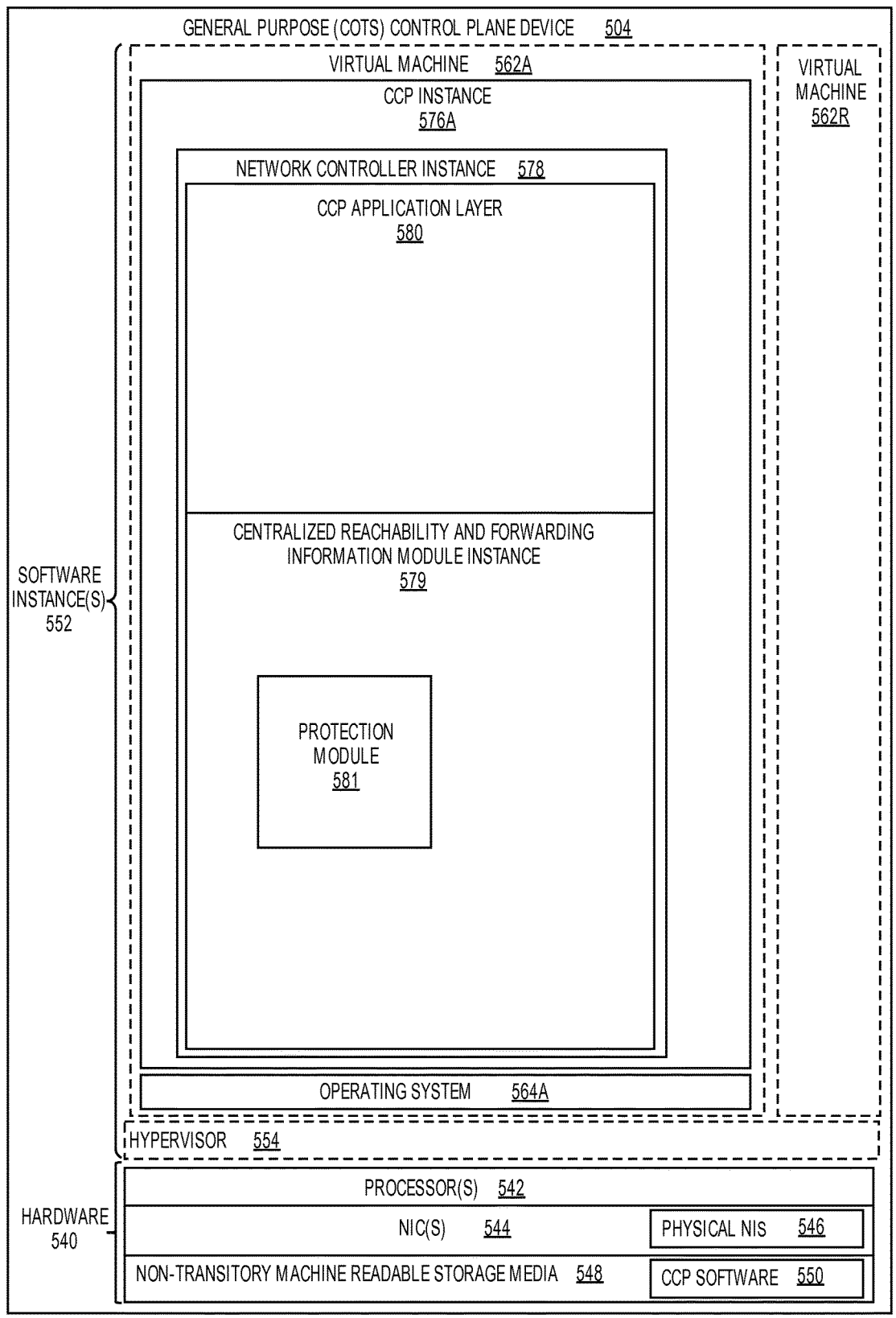
FIG. 5 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a hypervisor 554 (sometimes referred to as a virtual machine monitor (VMM)) and one or more virtual machines 562A-R that are run by the hypervisor 554; which are collectively referred to as software instance(s) 552. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 550 (illustrated as CCP instance 576A) on top of an operating system 564A are typically executed within the virtual machine 562A. In embodiments where compute virtualization is not used, the CCP instance 576A on top of operating system 564A is executed on the "bare metal" general purpose control plane device 504.

The operating system 564A provides basic processing, input/output (I/O), and networking capabilities. In some embodiments, the CCP instance 576A includes a network controller instance 578. The network controller instance 578 includes a centralized reachability and forwarding information module instance 579 (which is a middleware layer providing the context of the network controller instance 578 to the operating system 564A and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 976 works with virtual network view(s) (logical view(s) of the network) and the middleware layer provides the conversion from the virtual networks to the physical view. The CCP application can encompass the functionality of the protection module(s) 581 as described herein above.

The centralized control plane 576 transmits relevant messages to the data plane 680 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device for improving availability of network component using multi-chassis redundancy by efficiently re-routing data traffic intended for the network component in an event of a link or node failure, the network device in a set of network devices hosting the network component each network device in the set of network devices having a shared cluster identifier and a separate node identifier, the set of network devices hosting the network component sharing a virtual internet protocol address, the method comprising the steps of:
- receiving a data packet by a first node in the set of network devices destined for the network component via the virtual internet protocol address;
- checking whether a cluster identifier matches the shared cluster identifier;
- checking whether a node identifier matches the node identifier of the first node;
- checking whether a second node in the set of network devices is alive that matches the node identifier, where the node identifier does not match the node identifier of the first node;
- encapsulating the data packet to be sent to the second node where the second node is alive; and
- forwarding the encapsulated data packet to the second node where the second node is alive.

2. The method of claim 1, further comprising:
- encapsulating the data packet to be sent to a third node in the set of network devices where the second node is not alive; and
- forwarding the encapsulated data packet to the third node where the third node is a backup for the second node.

3. The method of claim 2, further comprising:
- processing the data packet where the second node and the third node are not alive or where the network device is the backup for the second node.

4. The method of claim 1, further comprising:
- rerouting the data packet to a cluster gateway where the cluster identifier does not match.

5. The method of claim 1, further comprising:
- receiving a hello packet from a group member node;
- checking whether the hello packet includes the shared cluster identifier;
- forwarding the hello packet to a default cluster gateway where the shared cluster identifier is not present;
- creating a group entry table; and
- subscribing to synchronize database with a corresponding active node and backup node identified using the group entry table.

6. A network device for improving availability of network component using multi-chassis redundancy by efficiently re-routing data traffic intended for the network component in an event of a link or node failure, the network device in a set of network devices hosting the network component each network device in the set of network devices having a shared cluster identifier and a separate node identifier, the set of network devices hosting the network component sharing a virtual internet protocol address, the network device comprising:
- a non-transitory computer-readable medium having stored therein a protection module; and
- a processor coupled to the non-transitory computer-readable medium, the processor configured to execute the protection module, the protection module configured to receive a data packet by a first node in the set of network devices destined for the network component via the virtual internet protocol address, to check whether a cluster identifier matches the shared cluster identifier, to check whether a node identifier matches the node identifier of the first node, to check whether a second node in the set of network devices is alive that matches the node identifier, where the node identifier does not match the node identifier of the first node, to encapsulate the data packet to be sent to the second node where the second node is alive, and to forward the encapsulated data packet to the second node where the second node is alive.

7. The network device of claim 6, where the protection module is further configured to encapsulate the data packet to be sent to a third node in the set of network devices where the second node is not alive, and to forward the encapsulated data packet to the third node where the third node is a backup for the second node.

8. The network device of claim 7, wherein the protection module is further configured to process the data packet where the second node and the third node are not alive or where the network device is the backup of the second node.

9. The network device of claim 6, wherein the protection module is further configured to reroute the data packet to a cluster gateway where the cluster identifier does not match.

10. The network device of claim 6, wherein the protection module is further configured to receive a hello packet from a group member node, to check whether the hello packet includes the shared cluster identifier, to forward the hello packet to a default cluster gateway where the shared cluster identifier is not present, to create a group entry table, and to subscribe to synchronize a database with a corresponding active node and backup node identified using the group entry table.

11. A computing device to execute a plurality of virtual machines for implementing network function virtualization (NFV), wherein a virtual machine from the plurality of virtual machines is configured to implement a method for improving availability of network component using multi-chassis redundancy by efficiently re-routing data traffic intended for the network component in an event of a link or node failure, a network device in a set of network devices hosting the network component each network device in the set of network devices having a shared cluster identifier and a separate node identifier, the set of network devices hosting the network component sharing a virtual internet protocol address, the computing device comprising:
- a non-transitory computer-readable medium having stored therein a protection module; and
- a processor coupled to the non-transitory computer-readable medium, the processor configured to execute the protection module, the protection module configured to receive a data packet via a first node in the set of network devices destined for the network component via the virtual internet protocol address, to check whether a cluster identifier matches the shared cluster identifier, to check whether a node identifier matches the node identifier of the first node, to check whether a second node in the set of network devices is alive that matches the node identifier, where the node identifier does not match the node identifier of the first node, to encapsulate the data packet to be sent to the second node where the second node is alive, and to forward the encapsulated data packet to the second node where the second node is alive.

12. The computing device of claim 11, where the protection module is further configured to encapsulate the data packet to be sent to a third node in the set of network devices where the second node is not alive, and to forward the encapsulated data packet to the third node where the third node is a backup for the second node.

13. The computing device of claim 12, wherein the protection module is further configured to process the data packet where the second node and the third node are not alive or where the network device is the backup of the second node.

14. The computing device of claim 11, wherein the protection module is further configured to reroute the data packet to a cluster gateway where the cluster identifier does not match.

15. The computing device of claim 11, wherein the protection module is further configured to receive a hello packet from a group member node, to check whether the hello packet includes the shared cluster identifier, to forward the hello packet to a default cluster gateway where the shared cluster identifier is not present, to create a group entry table, and to subscribe to synchronize database with active node based identified using the group entry table.

16. A control plane device is configured to implement a control plane of a software defined networking (SDN) network including a set of network devices implementing the method for improving availability of network component using multi-chassis redundancy by efficiently re-routing data traffic intended for the network component in an event of a link or node failure, a network device in the set of network devices hosting the network component, each network device in the set of network devices having a shared cluster identifier and a separate node identifier, the set of network devices hosting the network component sharing a virtual internet protocol address, the control plane device comprising:
 a non-transitory computer-readable medium having stored therein a protection module; and
 a processor coupled to the non-transitory computer-readable medium, the processor is configured to execute the protection module, the protection module configured to receive a data packet via a first node in the set of network devices destined for the network component via the virtual internet protocol address, to check whether a cluster identifier matches the shared cluster identifier, to check whether a node identifier matches the node identifier of the first node, to check whether a second node in the set of network devices is alive that matches the node identifier, where the node identifier does not match the node identifier of the first node, to encapsulate the data packet to be sent to the second node where the second node is alive, and to forward the encapsulated data packet to the second node where the second node is alive.

17. The control plane device of claim 16, where the protection module is further configured to encapsulate the data packet to be sent to a third node in the set of network devices where the second node is not alive, and to forward the encapsulated data packet to the third node where the third node is a backup for the second node.

18. The control plane device of claim 17, wherein the protection module is further configured to process the data packet where the second node and the third node are not alive or where the network device is the backup of the second node.

19. The control plane device of claim 16, wherein the protection module is further configured to reroute the data packet to a cluster gateway where the cluster identifier does not match.

20. The control plane device of claim 16, wherein the protection module is further configured to receive a hello packet from a group member node, to check whether the hello packet includes the shared cluster identifier, to forward the hello packet to a default cluster gateway where the shared cluster identifier is not present, to create a group entry table, and to subscribe to synchronize database with active node or passive node identified using the group entry table.

\* \* \* \* \*